United States Patent
Sone et al.

(10) Patent No.: US 8,571,058 B2
(45) Date of Patent: Oct. 29, 2013

(54) TERMINAL APPARATUS, DATA TRANSMISSION SYSTEM AND DATA TRANSMISSION METHOD

(75) Inventors: Kyosuke Sone, Kawasaki (JP); George Ishikawa, Kawasaki (JP); Susumu Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 12/949,124

(22) Filed: Nov. 18, 2010

(65) Prior Publication Data

US 2011/0116803 A1    May 19, 2011

(30) Foreign Application Priority Data

Nov. 19, 2009  (JP) ................. 2009-263564

(51) Int. Cl.
 *H04J 3/16* (2006.01)
 *H04J 14/00* (2006.01)
 *H04J 14/02* (2006.01)
 *H04J 14/08* (2006.01)

(52) U.S. Cl.
 USPC ............. 370/437; 398/71; 398/79; 398/92; 398/98

(58) Field of Classification Search
 USPC ............. 370/389, 437–440; 398/79–83, 98
 See application file for complete search history.

(56) References Cited

U.S. PATENT DOCUMENTS

| | | | |
|---|---|---|---|
| 2004/0252714 A1* | 12/2004 | Oh et al. | 370/437 |
| 2007/0019956 A1* | 1/2007 | Sorin et al. | 398/71 |
| 2008/0166127 A1 | 7/2008 | Kazawa et al. | |
| 2008/0187317 A1 | 8/2008 | Yamabana | |
| 2008/0253568 A1 | 10/2008 | Sakai et al. | |
| 2009/0202242 A1 | 8/2009 | Niibe et al. | |
| 2009/0226170 A1* | 9/2009 | Zou | 398/79 |

FOREIGN PATENT DOCUMENTS

| | | |
|---|---|---|
| JP | 2002-141927 A | 5/2002 |
| JP | 2004-040454 A | 2/2004 |
| JP | 2007-116587 A | 5/2007 |
| JP | 2008-017264 A | 1/2008 |
| JP | 2008-172351 A | 7/2008 |
| JP | 2008-193184 | 8/2008 |
| JP | 2008-263451 A | 10/2008 |
| JP | 2009-188901 | 8/2009 |

* cited by examiner

*Primary Examiner* — Brandon Renner
(74) *Attorney, Agent, or Firm* — Fujitsu Patent Center

(57) ABSTRACT

There is provided a terminal apparatus including a message monitor to gather transmission request information from each of first and second terminating apparatus, a dynamic bandwidth allocation unit to allocate each transmission band in accordance with the gathered transmission request information, determine a size and an alignment position of a time slot in accordance with the allocated transmission band, determine a transmission start time of the time slot, and allocate an extinction period so as to stop a transmission of an optical signal between a time slot of the optical signal with the second transmission rate and a time slot following the time slot of the optical signal with the second transmission rate, and a MAC controller to generate a control frame for notifying each of the first and second terminating apparatus of the transmission start time and the size of the time slot.

3 Claims, 12 Drawing Sheets

TERMINAL APPARATUS, DATA TRANSMISSION SYSTEM AND DATA TRANSMISSION METHOD

CROSS-REFERENCE TO RELATED APPLICATION

This application is based upon and claims the benefit of priority of the prior Japanese Patent Application No. 2009-263564, filed on Nov. 19, 2009, the entire contents of which are incorporated herein by reference.

FIELD

The embodiments discussed herein are related to a terminal apparatus, a data transmission system and a data transmission method, and may be applicable to a passive optical network (PON), for example.

BACKGROUND

In recent years, optical access systems have used optical communication systems each of which accommodate a plurality of subscribers with a passive double star configuration, such as Ethernet-PON (E-PON) and Gigabit capable-PON (G-PON). Some of the optical communication systems may have a transmission capacity in the range of 1 Gbps (hereinafter, will be simply written as "G"), for example.

The application of a communication system having a transmission capacity of 10G has been considered for next generation PON systems in order to increase the transmission rate. For longer distances and more branches in order to expand a service range, the addition of a repeater has also been examined.

A PON system that is acceptable to mixed systems having different transmission rates may be assumed for an economically and efficiently improved transmission rate. For example, the network system may correspond to a mixed system including both 1G system and 10G system. In such a network system, the integration of a repeater may be assumed for longer transmission distance.

Those technologies may be disclosed in Japanese Laid-open Patent Publication Nos. 2008-17264 and 2002-141927.

SUMMARY

According to an aspect of the embodiment, there is provided a terminal apparatus connecting through a splitter and a repeater with each of a first terminating apparatus to perform processing on an optical signal with a first transmission rate and a second terminating apparatus to perform processing on an optical signal with a second transmission rate lower than the first transmission rate, the terminal apparatus including a message monitor to gather transmission request information from each of the first terminating apparatus and the second terminating apparatus, a dynamic bandwidth allocation unit to allocate each transmission band for communicating with each of the first terminating apparatus and the second terminating apparatus in accordance with the gathered transmission request information, determine a size and an alignment position of a time slot in accordance with the allocated transmission band, determine a transmission start time of the time slot for each of the first terminating apparatus and the second terminating apparatus, and allocate an extinction period so as to stop a transmission of an optical signal between a time slot of the optical signal with the second transmission rate and a time slot following the time slot of the optical signal with the second transmission rate, and a MAC controller to generate a control frame for notifying each of the first terminating apparatus and the second terminating apparatus of the transmission start time and the size of the time slot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In order to develop a repeater that is adaptable to a network system including mixed systems having different transmission rates, such as 1G/10G mixed systems, common processing on a 1G signal (signal with a bit rate of 1 Gbps) and a 10G signal (signal with a bit rate of 10 Gbps) may be required to consider, as will be described below.

For example, a signal processing of the 1G signal needs a wider wavelength range so it is difficult to amplify the 1G signal with an optical amplifier, while a signal processing of the 10G signal does not need the wider wavelength range so it is able to amplify the 10G signal with an existing optical amplifier. Thus, using a common optical amplifier for the optical amplification is not easy.

The 1G signal may be processed with a regenerator that performs optical/electrical conversion (O/E conversion) and/or electrical/optical conversion (E/O conversion) in the past, instead of using the optical amplification processing by using an optical amplifier for the 10G signal. On the other hand, in order to process the 10G signal with the regenerator, the repeater performing the processing may have high performance, which may increase the cost.

Accordingly, it is an object in one aspect of the embodiment to implement proper communication with different optical signals in a network system including mixed optical signals with different transmission rates. It may be another object to support relay processing in accordance with the transmission rate and transmission direction of an optical signal to be transmitted bidirectionally in case that mixed optical signals with different transmission rates are to be handled.

It may be, without limiting to the objects, another object to provide an effect to be led by a configuration or operation described in an embodiment which will be described below and which may not be provided by technologies in the past.

With reference to drawings, embodiments will be described below. The embodiments will be described below for illustration purposes only and not for intentions to exclude the application of different variations and technologies that are not explicitly described below. In other words, the embodiments may be changed, modified or altered without departing from the scope and spirit.

First Embodiment

Figure 1:
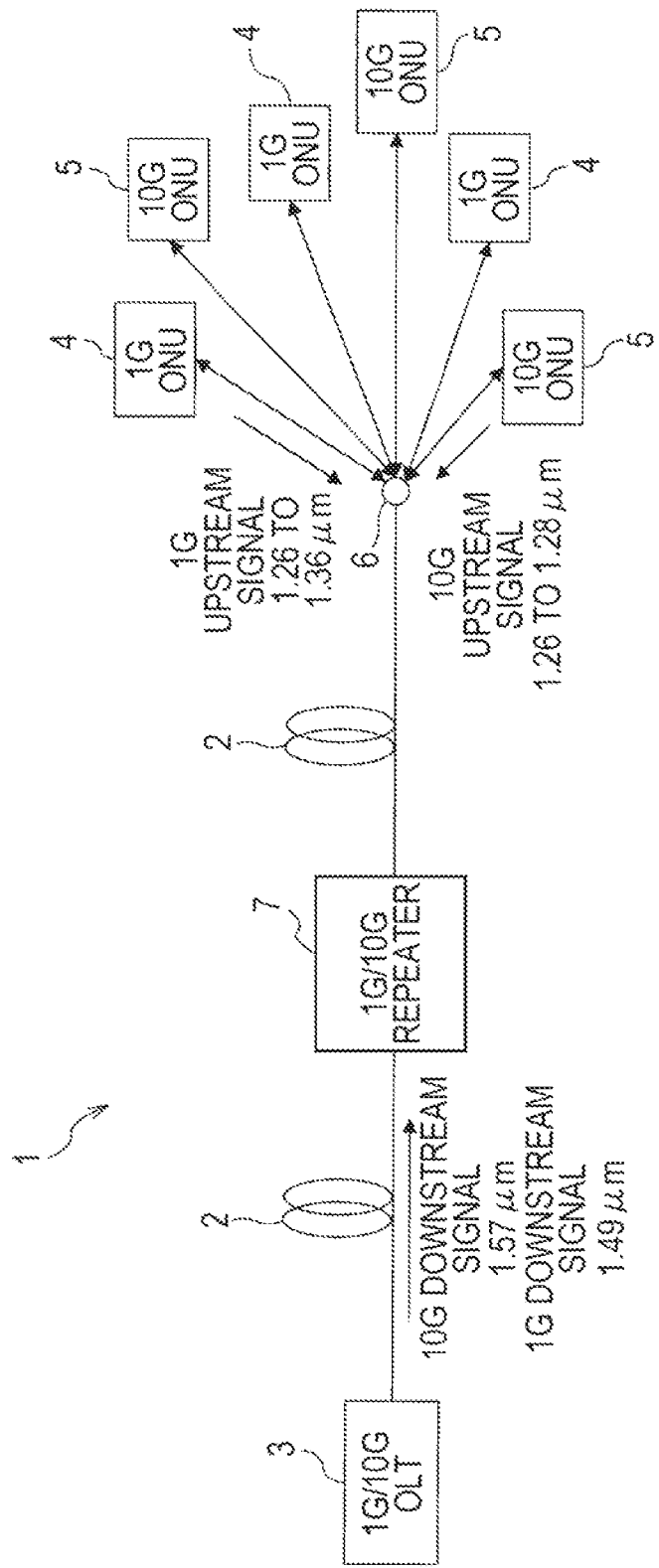
FIG. 1 illustrates a configuration of a network system having an optical transmission line through which mixed optical signals with different transmission rates are transmitted.

FIG. 1 illustrates a configuration of a network system (optical communication system) 1 having an optical transmission line 2 through which mixed optical signals with different transmission rates (such as 1G and 10G) are transmitted.

Figure 2:
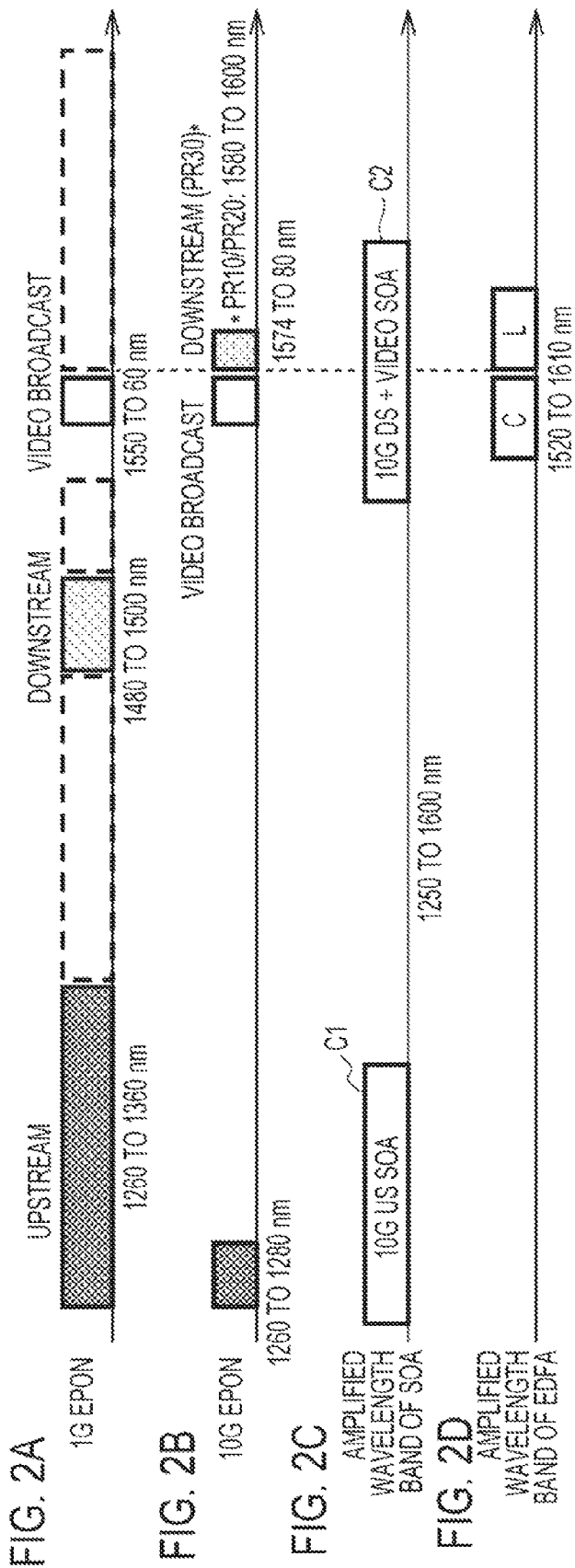
FIGS. 2A and 2B illustrate wavelength ranges to be used in E-PON.
FIGS. 2C and 2D illustrate amplified wavelength band according to the optical amplifiers.

FIGS. 2A to 2D illustrate wavelength ranges. FIG. 2A illustrates a wavelength range to be used in 1G E-PON. FIG. 2B illustrates a wavelength range to be used in 10G E-PON. FIG. 2C illustrates an amplified wavelength range for a SOA (Semiconductor Optical Amplifier). FIG. 2D illustrates an amplified wavelength range for an EDFA (Erbium Doped Fiber Amplifier).

In a network system 1 illustrated in FIG. 1, an OLT (Optical Line Terminal: terminal apparatus) 3 and a plurality of ONUs (Optical Network Units: terminating apparatus) 4 and 5 communicate by using optical signals. The OLT 3 has a specification shared with transmission rates of 1G/10G. The ONU 4 has a specification that performs processing on a signal with a transmission rate of 1G, and the ONU 5 has a specification that performs processing on a signal with a transmission rate of 10G. The optical transmission line 2 has a star-shaped network topology and connects to the OLT 3 and ONUs 4 and 5 through an optical splitter 6 and a repeater 7. In other words, the OLT 3 is a terminal apparatus that performs communication by using an optical signal in accordance with at least two kinds of transmission rates (such as 1G and 10G) which are different from each other. The ONUs 4 and 5 are terminating apparatuses connected to the OLT 3 through the optical transmission line 2.

The ONUs 4 and 5 are classified to at least the two kinds of transmission rates to be applied to the communication with the OLT 3. For example, the ONU 4 processes a 1G signal which undergoes relay processing including electric signal processing in the repeater 7 which will be described below. The ONU 5 processes a 10G signal which undergoes relay processing as an optical signal in the repeater 7.

In FIG. 1, the optical splitter 6 connected to the ONUs 4 and 5 is connected to the optical transmission line 2 allocated on the side without the OLT 3 (or downstream side) of the repeater 7. However, the optical splitter 6 may be connected to the optical transmission line 2 allocated on side with the OLT 3 (or upstream side) of the repeater 7. Alternatively, the optical splitter 6 may be connected to the optical transmission lines 2 allocated on the upstream and downstream sides of the repeater 7.

The transmission systems of the OLT 3 and ONU 4 may apply 1G E-PON. In this case, as illustrated in FIG. 2A, a 1G downstream signal (DS), which is an optical signal in the direction from the OLT 3 to the ONU 4, has a wavelength of 1480 to 1500 nm. A 1G upstream signal (US), which is an optical signal in the direction from the ONU 4 to the OLT 3, has a wavelength of 1260 to 1360 nm.

The transmission systems of the OLT 3 and ONU 5 may apply 10G E-PON. In this case, as illustrated in FIG. 2B, a 10G downstream signal has a wavelength of 1574 to 1580 nm, and the upstream signal has a wavelength of 1260 to 1280 nm. Thus, a 10G upstream signal has a wavelength range overlapping with that of a 1G upstream signal. Notably, the transmission system between the OLT 3 and the ONUs 4 and 5 may apply other systems such as G-PON.

The OLT 3 first grasps transmission time differences according to the transmission distances to the ONUs 4 and 5 and allocates a time (time slot) allowing transmission of an optical signal in the upstream direction to each of the ONUs 4 and 5. Thus, communication may be implemented with time division multiplex or time division multiple access.

In other words, since optical signals particularly in the upstream direction with different transmission rates of 1G and 10G have an overlapped wavelength range, 1G and 10G upstream optical signals are distinguished on the basis of the allocation of time slots instead of distinction in optical wavelength units, in the OLT 3.

Figure 3:
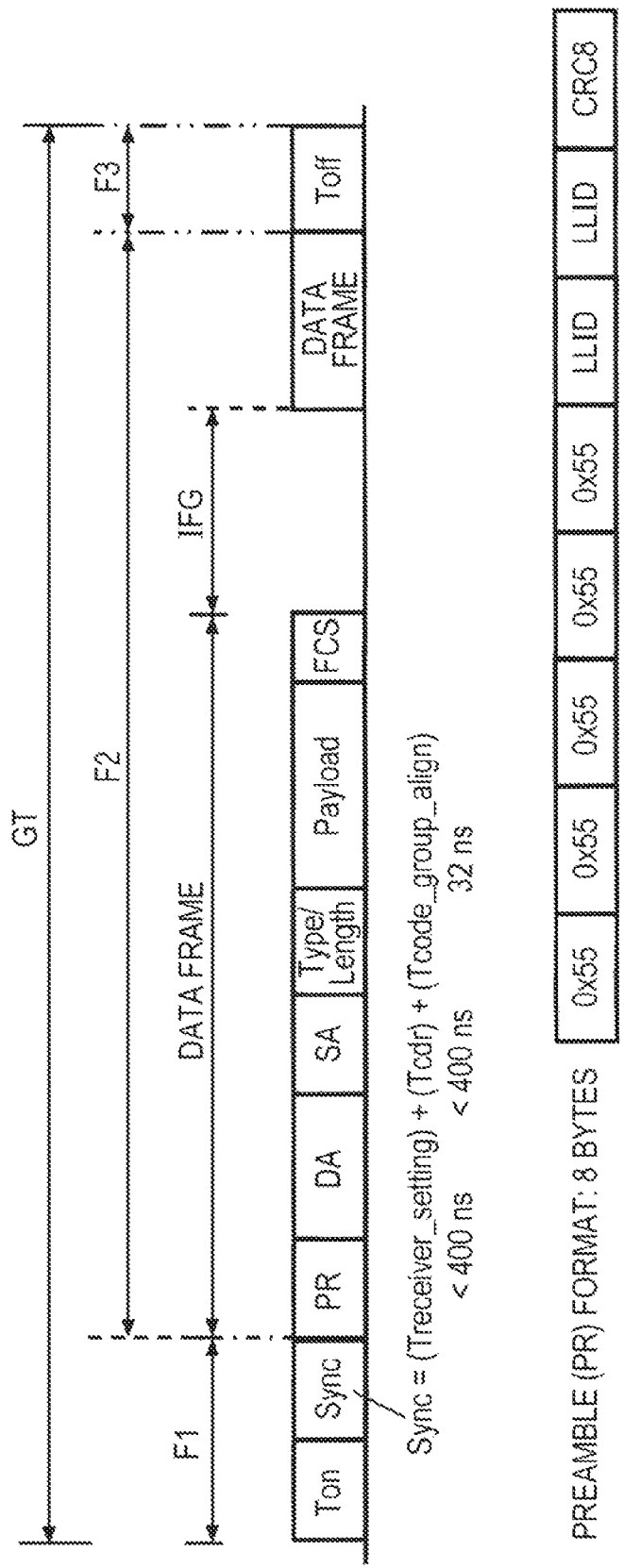
FIG. 3 illustrates a format within a time slot in E-PON.

FIG. 3 illustrates a format within one time slot to be allocated to the ONU 4 for 1G when E-PON is applied. The illustrated format has time slots corresponding to an allocated period (or grant time: GT) as illustrated in FIG. 3 for each of the ONUs 4 and 5 on the time axis under the control of the OLT 3.

Here, one grant time GT for the ONU 4 has, as illustrated in FIG. 3, a PON overhead part F1 at the beginning, a data period F2 next, and a falling period F3 (Toff) at the end. The PON overhead part F1 has a rising period (Ton) of an optical signal and a synchronization period (Sync).

The synchronization period (Sync) is a period for frame synchronization on an input signal. For example, the synchronization period (Sync) is a period for frame synchronization by the OLT 3 or repeater 7, which will be described below, on an upstream signal. The synchronization period (Sync) has Treceiver_setting, Tcdr, and Tcode_group_align. The Treceiver_setting is a period for adjusting a received optical waveform level. The Tcdr is a bit synchronization period for extracting a receive clock from received data. The Tcode_group_align is a byte synchronization period for received data. The Treceiver_setting and Tcdr are shorter than 400 ns, and the Tcode_group_align may be about 32 ns.

The data period (F2) has data frames having an inter frame gap (IFG) therebetween. The data frame has, from the beginning on the time axis, PR, DA (destination address), SA (source address), Type/Length, Payload and FCS (frame check sequence). The PR indicates preamble period, and the DA and SA are periods for indicating a destination address and a source address, respectively. The Type/Length is a period for indicating a data attribute and/or a data length, the Payload is a period for indicating a main signal, and the FCS is a period for indicating information for error correction. The format of PR has, as illustrated in FIG. 3, a 5-byte alternating code, a following 2-byte LLID (Logical Link ID) and an 8-bit CRC 8 (Cyclic Redundancy Check). In FIG. 3, "0x55" indicates an alternating code in the hexadecimal notation and "01010101" in the binary notation.

The ONUs 4 and 5 transmit an optical signal having a frame configuration as described above at timings determined on their time slots. The OLT 3 receives the optical signals transmitted from the ONUs 4 and 5. In the OLT 3, communication by using time slots individually allocated to the ONUs 4 and 5 allows distinction between optical signals having different transmission rates and distinction between source ONUs 4 and 5. In the case where optical signals are allocated wavelength ranges which do not overlap with each other, the wavelength ranges may be used to distinguish between the optical signals.

The repeater 7 illustrated in FIG. 1 is applied in such a network system for a longer transmission distance and performs relay processing according to the transmission rates of optical signals in an upstream direction (first direction) and a downstream direction (second direction). The relay processing includes processing of amplifying an optical signal propagated through the optical transmission line 2 to an expected level.

In the case where the E-PON spec is applied in the OLT 3 and ONUs 4 and 5, 1G and 10G upstream signals have overlapping wavelength ranges as a result. In the 1G/10G mixed system in this case, stopping the optical amplification processing on a 10G optical signal may be required during the period when a 1G signal is passing. For proper relay processing on a 10G optical signal, its output level is preferably controlled (automatic level control: ALC control) to a target value in response to a burst signal.

Figure 4:
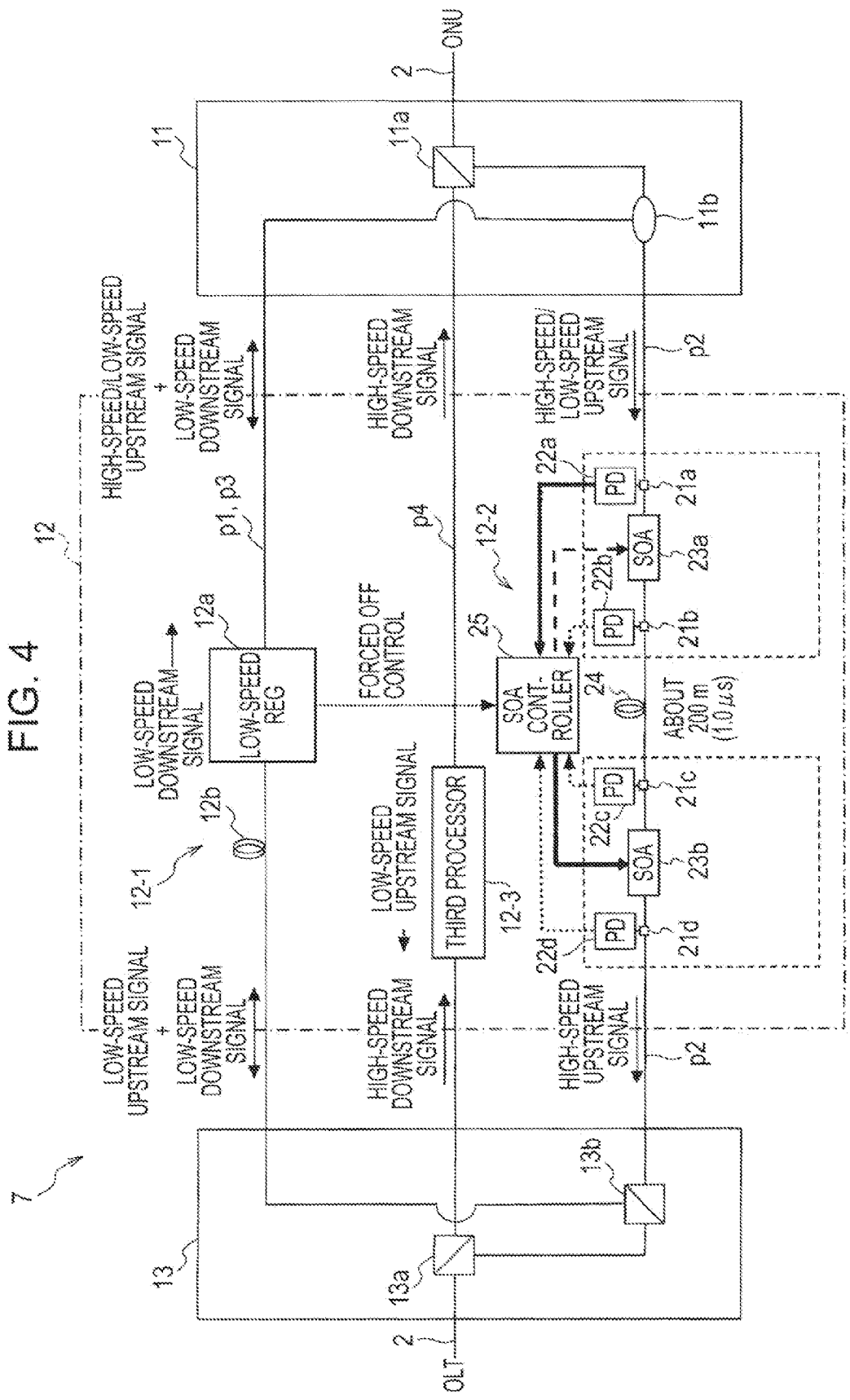
FIG. 4 illustrates a repeater.

For example, the repeater 7 illustrated in FIG. 4 may be used to perform relay processing on 1G and 10G optical signals. In the repeater 7, as illustrated in FIG. 2A, signal regeneration processing in the electrical processing domain is performed for processing on 1G upstream and downstream optical signals having a wider wavelength range. On the other hand, a 10G downstream optical signal having a wavelength range that does not overlap with other signal wavelength range is directly amplified (optical amplification) without the signal regeneration processing in the electrical processing domain.

In FIG. 4, the transmission rate 1G and transmission rate 10G correspond to "LOW-SPEED" and "HIGH-SPEED", respectively. However, the notations "LOW-SPEED" and "HIGH-SPEED" intend to the distinction based on the relativity between two transmission rates and do not intend the exclusion of other transmission rates.

The illustrated repeater 7 includes a first interface section 11, a signal processing section (it may be described as processing section) 12 and a second interface section 13. The first interface section 11 is connected to the optical transmission line 2 on the ONUs 4 and 5 side (or downstream side), and the second interface section 13 is connected to the optical transmission line 2 on the OLT 3 side (or upstream side).

Focusing on an optical signal in the upstream direction that is a first direction, the first interface section 11 separates an optical signal input in the upstream direction (first direction) from the downstream side of the optical transmission line 2 and leads the separated optical signal to a first path p1 and second path p2. The first path p1 is a path for processing an optical signal having a first transmission rate (such as 1 Gbps). The second path p2 is a path for processing an optical signal having a second transmission rate (such as 10 Gbps) that is different from the first transmission rate.

The processing section 12 performs processing according to the transmission rates corresponding to upstream optical signals that propagate through the paths p1 and p2. More specifically, the processing section 12 performs relay processing on upstream optical signals input from the first interface section 11 through the first and second paths p1 and p2 in accordance with the transmission rates of the optical signals allocated to the time slots.

The second interface section 13 multiplexes wavelengths of optical signals on the first path p1 and second path p2 which are propagation paths for optical signals processed in the processing section 12 and leads the multiplexed optical signals to the optical transmission line 2 on the other OLT 3. This allows the repeater 7 to relay optical signals in the upstream direction.

Focusing on a downstream optical signal that is a second direction, the second interface section 13 receives an optical signal from the optical transmission line 2 and leads it to a third path p3 or fourth path p4 that is set in accordance with the wavelength range. For example, in E-PON, since a downstream optical signal having a first transmission rate (1 Gbps) and a downstream optical signal having a second transmission rate (10 Gbps) have different wavelength ranges, an input optical signal is led to the output path set in accordance with the wavelength so as to switch the optical signal path in accordance with the transmission rate. The third path p3 and the first path p1 in the upstream direction may be commonly used as a same path.

The processing section 12 performs relay processing according to the transmission rate corresponding to a downstream optical signal that propagates through the third path p3 or the fourth path p4. The first interface section 11 multiplexes optical signals on the third path p3 and the fourth path p4 which are paths for downstream optical signals processed in the processing section 12 and leads the multiplexed optical signals to the optical transmission line 2. This allows the repeater 7 to relay optical signals in the downstream direction.

The first interface section 11 has a first transmission/reflection filter (filter #1) 11a and an optical coupler 11b. The first transmission/reflection filter 11a connects the optical transmission line 2 and the fourth path p4 as a transmission route and connects the optical transmission line 2 and the common first or third path p1 (p3) and second path p2 as a reflection route. The optical coupler 11b connects to join or branch the common first or third path p1 or p3 and second path p2 with the reflection route of the transmission/reflection filter 11a.

Figure 5:
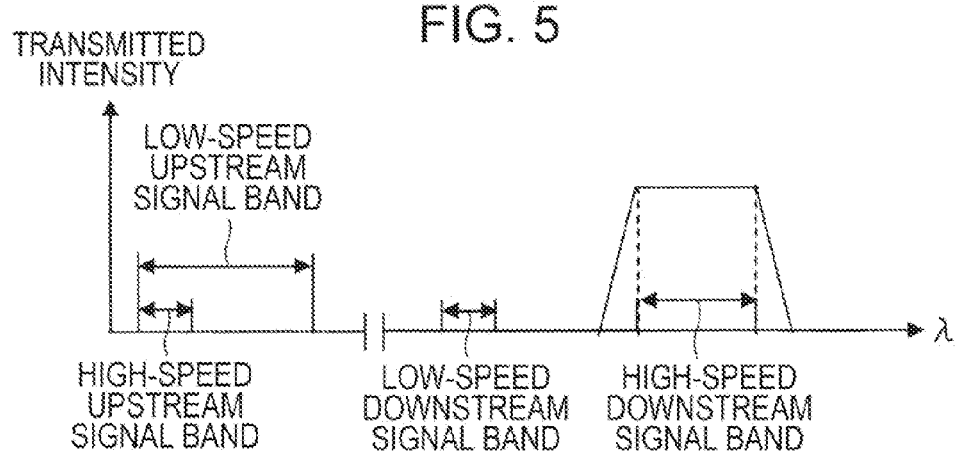
FIG. 5 illustrates characteristics of first and second transmission/reflection filters.

FIG. 5 illustrates a wavelength transmission/reflection characteristic of the first transmission/reflection filter 11a. As illustrated in FIG. 5, the first transmission/reflection filter 11a allows light having a wavelength range corresponding to a downstream optical signal of 10G (second transmission rate) to pass through. On the other hand, the first transmission/reflection filter 11a reflects light having other wavelength ranges, that is, 1G upstream and downstream optical signals and 10G upstream optical signals.

Thus, optical signals input from the ONUs 4 and 5 through the optical transmission line 2 are reflected by the first transmission/reflection filter 11a and are branched in the optical coupler 11b and are thus led to the first and second paths p1 and p2.

The first interface section 11 receives a 10G downstream optical signal through the fourth path p4 from the processing section 12. Since the downstream optical signal passes through the first transmission/reflection filter 11a, it is led to the optical transmission line 2 on the downstream side. The first interface section 11 receives a 1G downstream optical signal through the third path p3 (p1) from the processing section 12. Since the downstream optical signal is reflected by the first transmission/reflection filter 11a, it is led to the optical transmission line 2 on the downstream side.

As illustrated in FIG. 4, the second interface section 13 has a second transmission/reflection filter (filter #1) 13a and a third transmission/reflection filter (filter #2) 13b. The second transmission/reflection filter 13a connects the optical transmission line 2 and the fourth path p4 as a transmission route and connects the optical transmission line 2 and the third transmission/reflection filter 13b as a reflection route.

The third transmission/reflection filter 13b is connected with the reflection route of the second transmission/reflection filter 13a toward the optical transmission line 2. The third transmission/reflection filter 13b connects the second transmission/reflection filter 13a and the first and third paths p1 and p3, which are common in the upstream and downstream directions, through the reflection route. The third transmission/reflection filter 13b connects the second transmission/reflection filter 13a and the second path p4 through the transmission route.

The second transmission/reflection filter 13a may have the same characteristic as the case in FIG. 5, that is, the same wavelength transmission characteristic as the first transmission/reflection filter 11a.

Figure 6:
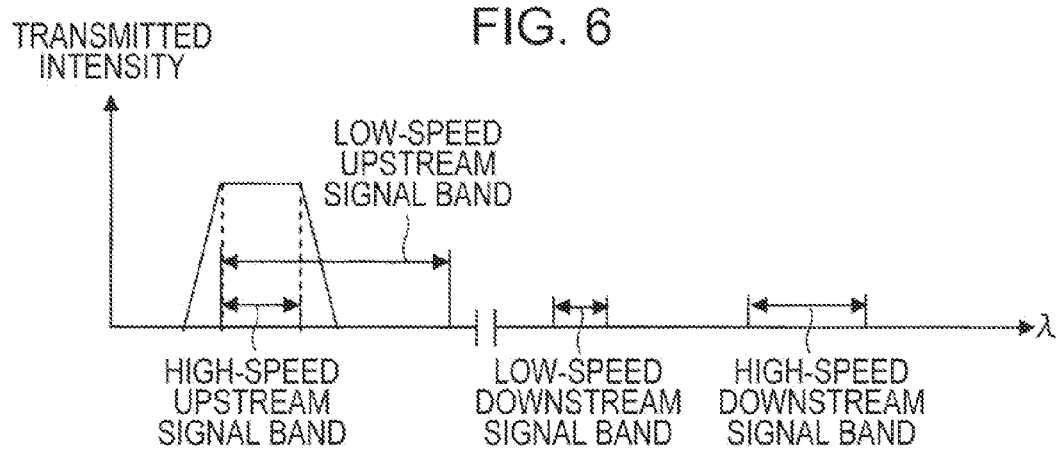
FIG. 6 illustrates a characteristic of a third transmission/reflection filters.

The third transmission/reflection filter 13b has a wavelength transmission characteristic as illustrated in FIG. 6. In other words, the third transmission/reflection filter 13b allows light having a wavelength range corresponding to an upstream optical signal of 10 Gbps (second transmission rate) to pass through. On the other hand, the third transmission/reflection filter 13b reflects light having other wavelength ranges, that is, optical signals without partial wavelength ranges (or wavelength ranges overlapping with that of a 10G upstream optical signal) of 1 Gbps upstream optical signals, and optical signals with wavelength ranges of 1 Gbps downstream optical signals and 10 Gbps downstream optical signals.

Thus, the second transmission/reflection filter 13a in the second interface section 13 allows a 10G optical signal to pass through of the optical signals input from the OLT 3 through the optical transmission line 2 and leads it to the fourth optical path p4 while a 1G optical signal to reflect. The third transmission/reflection filter 13b further reflects a 1G downstream optical signal reflected by the second transmission/reflection filter 13a and leads it to the third path p3 (p1).

The second interface section 13 receives a 1G upstream optical signal from the processing section 12 through the first path p1 and a 10G upstream signal from the processing section 12 through the second path p2.

Here, the 1G upstream optical signal is reflected by the third transmission/reflection filter 13b and second transmission/reflection filter 13a and is transmitted to the optical transmission line 2. This is because the wavelength of 1G upstream optical signal is converted in the processing section 12 so that its entire components are reflected by the third transmission/reflection filter 13b. On the other hand, the 10G upstream optical signal passes through the third transmission/reflection filter 13b, is reflected by the second transmission/reflection filter 13a and is transmitted to the optical transmission line 2.

The processing section 12 performs relay processing on an upstream optical signal input from the first interface section 11 in accordance with the transmission rate of the optical signal allocated to its time slot and transmits the processed optical signal through the second interface section 13 to the optical transmission line 2. In the same manner, the processing section 12 performs relay processing on an upstream optical signal input from the second interface section 13 in accordance with the transmission rate of the optical signal allocated to its time slot and transmits the processed optical signal through the first interface section 11 to the optical transmission line 2. For these operations, the processing section 12 has a first processor 12-1, a second processor 12-2, and a third processor 12-3.

The first processor 12-1 performs relay processing corresponding to a 1G optical signal on an optical signal of the upstream first path p1 direction from the first interface section 11. In other words, the first processor 12-1 receives both 1G optical signal and 10G optical signal at a mixed state but performs 1G-signal regeneration processing through electrical processing. The regeneration processing blocks an output of an optical signal corresponding to 10G and outputs an optical signal corresponding to 1G.

For example, the first processor 12-1 includes a regenerator (low-speed reg.) 12a which performs signal regeneration processing with synchronization processing on a signal corresponding to 1G, and an optical delay line 12b. The processing by the regenerator 12a includes synchronization processing such as extraction of a 1G clock signal based on the Sync (in FIG. 3, for example) in a time slot allocated for one of the ONUs 4 for 1G.

In this case, the regenerator 12a does not perform regeneration processing on a 10G signal and does not extract a clock signal in a time slot allocated to one of the ONUs 5 for 10G. In other words, the regenerator 12a is not capable of reading the LLID in a preamble (PR) at least in a time slot allocated to a 10G optical signal. Thus, in the time slot, the processing for a time slot for a 1G signal is not performed, and an optical signal having undergone the signal regeneration processing is not output.

The regenerator 12a further performs conversion to narrow the wavelength of an 1G optical signal input from the first path p1 by E/O conversion processing after the electrical processing. More specifically, the third transmission/reflection filter 13b and second transmission/reflection filter 13a in the second interface section 13 perform wavelength conversion so that the third transmission/reflection filter 13b may reflect all wavelength components of a 1G upstream optical signal and lead them to the second transmission/reflection filter 13a.

For example, the second transmission/reflection filter 13a reflects all bands in a wavelength range (such as 1.26 to 1.36 μm) of light input as a 1G upstream optical signal. On the other hand, the third transmission/reflection filter 13b transmits light in a wavelength range of 1.26 to 1.28 μm that is a wavelength range of a 10G upstream optical signal.

Accordingly, the regenerator 12a converts wavelength range (such as 1.26 to 1.36 μm) of light input as a 1G upstream optical signal to an optical signal of a wavelength range of 1.29 to 1.36 μm corresponding to the reflection wavelength range of the third transmission/reflection filter 13b. Thus, 1G upstream optical signals are transmitted through the third transmission/reflection filter 13b and the second transmission/reflection filter 13a to the optical transmission line 2 on the OLT 3 side.

In other words, the wavelength conversion in the regenerator 12a avoids the overlapping between a wavelength range of a 1G upstream signal and a wavelength range of a 10G upstream signal. Thus, the optical filter (third transmission/reflection filter) 13b may be provided in a part where 1G and 10G upstream signals are joined, instead of an optical coupler, which reduces the loss. Furthermore, the optical filter (third transmission/reflection filter) 13b is caused to function as a cut filter for unnecessary ASE (Amplified Spontaneous Emission) components in semiconductor optical amplifiers (SOAs) 23a and 23b which are elements of the second processor 12-2. Since the SOAs 23a and 23b have an OFF state when light is not input thereto, the overlapping of ASE occurring from the SOAs 23a and 23b with upstream signals is avoided when an ONU is provided on the upstream side of the repeater 7.

The regenerator 12a performs signal regeneration processing on a downstream optical signal from the third path p3 that is also used as the first path p1. Among downstream optical signals input to the second interface section 13, an optical signal having a transmission rate of 1G is led to the third path p3, and an optical signal having a transmission rate of 10G is led to the fourth path p4. Thus, the first processor 12a performs signal regeneration processing on a downstream 1G optical signal.

The optical delay line (first delay part) 12b included in the first processor 12-1 gives a delay to an optical signal propagating through the first path p1 (or third path p3). Thus, the propagation time of an optical signal propagating through the first path p1 between the first and second interface sections 11 and 13 may be equal to the propagation time of the optical signal propagating through the second path p2 between the first and second interface sections 11 and 13.

The second processor 12-2 performs processing corresponding to an 10G optical signal that is a second transmission rate on an optical signal having an upstream direction (first direction) in the second path p2. The illustrated second processor 12-2 has optical couplers 21a to 21d, photo diodes 22a to 22d, SOAs 23a and 23b, an optical delay line 24 and a SOA controller 25.

The optical couplers 21a to 21d separate input optical signals (mixed signals of 1G and 10G optical signals) propagating through the second path p2 and leads one of them to the corresponding one of the photo diodes 22a to 22d and leads the other in the direction toward the second interface section 13. Here, the optical coupler 21a is provided on the input side of the SOA 23a, and the optical coupler 21b is provided on the output side of the SOA 23a. Similarly, the optical coupler 21c is provided on the input side of the SOA 23b, and the optical coupler 21d is provided on the output side of the SOA 23b.

The photo diodes 22a to 22d monitor the levels of optical signals from the corresponding optical couplers 21a to 21d. The SOAs 23a and 23b are controlled by the SOA controller 25 so as to amplify optical signals input from the optical couplers 21a and 21c through the second path p2.

More specifically, the SOA controller 25 controls the SOA 23a on the input side so as to keep it ON state at all times regardless of the presence of optical input. On the other hand, the SOA controller 25 controls the SOA 23b on the output side so as to turn it OFF state when optical input is not detected in the photo diode 22a (or 22b), which blocks optical signals to the second interface section 13 side. When optical input is detected in the photo diode 22a (or 22b), the SOA 23b is controlled so as to turn it ON state. Thus, optical signals input through the optical delay line 24 and optical coupler 21c are led to the second interface section 13.

Figure 7:
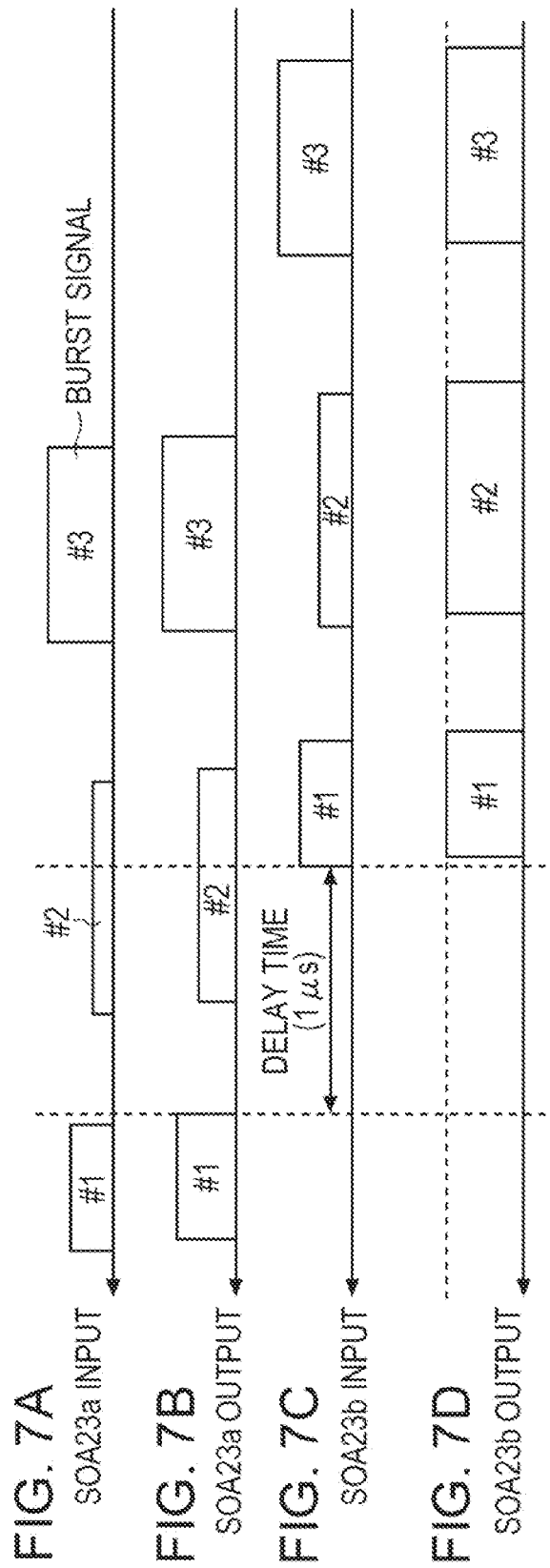
FIGS. 7A to 7D illustrate ALC control by a second processor.

In this case, the SOA 23b performs expected relay processing (optical amplification) on a 10G optical signal. The SOA controller 25 may, as illustrated in FIG. 7, perform automatic level control (ALC) on the amplification efficiency of the SOA 23b in accordance with the monitoring result from the photo diodes 22c and 22d.

The SOA controller 25 receives an electric signal with the level according to the input light intensity from the photo diode 22a (or 22b). The presence of optical input is detected on the basis of the determination with reference to a predetermined value regarding levels of electric signals. In this case, for stable control, the predetermined value for determining a state with optical input is higher than the predetermined value for determining the shift from a state with optical input to an extinction state (or state without optical input).

The optical delay line 24 has a delay time for allowing the SOA controller 25 to complete the ON control on the SOA 23b before the head of input optical signal detected in the photo diode 22a (or 22b) is input. The delay time may be set on the basis of the response times of the photo diode 22a (or 22b), SOA controller 25 and SOA 23b, for example.

Figure 8:
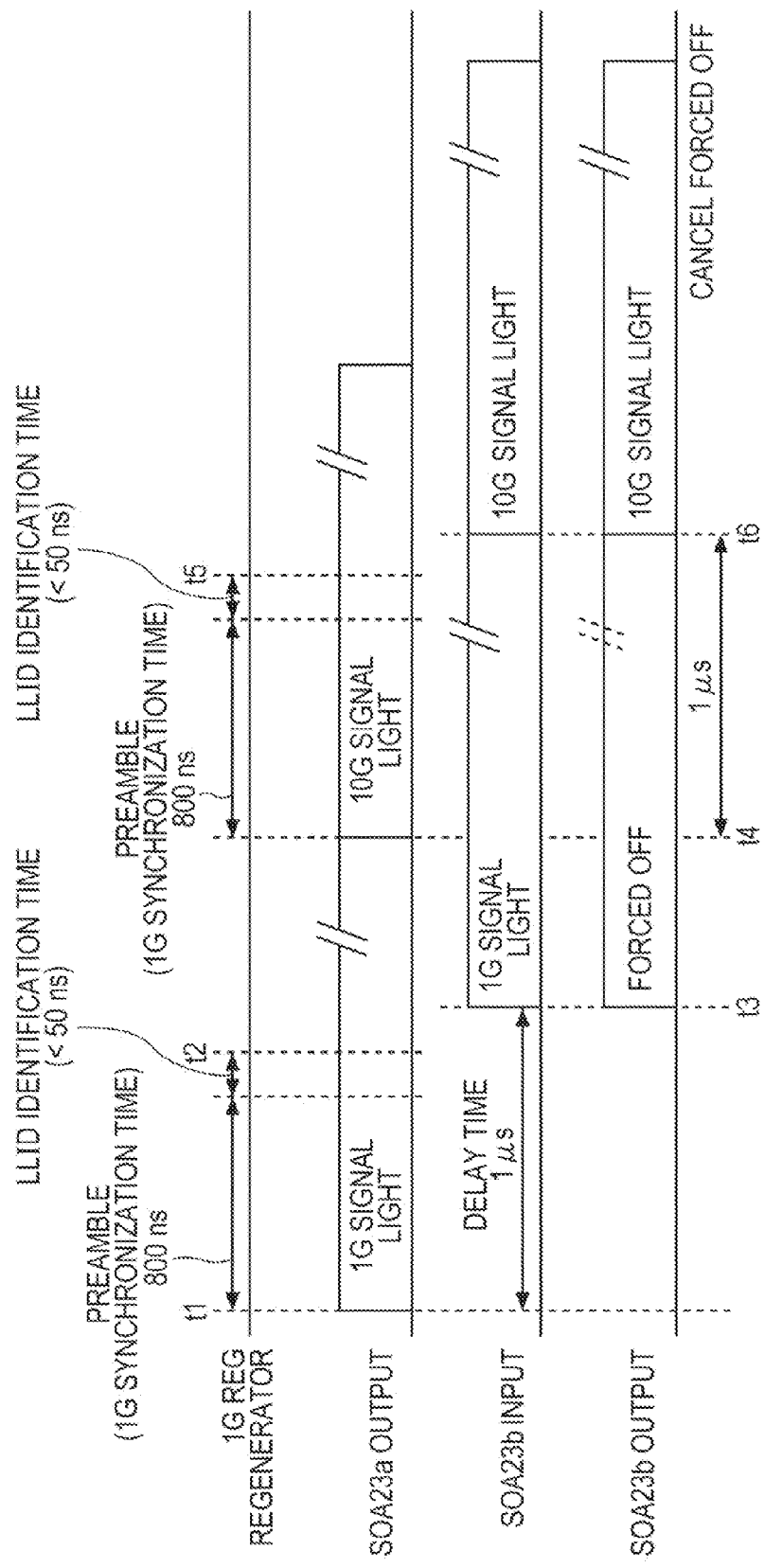
FIG. 8 illustrates the switching between passing and blocking by the second processor.

FIGS. 7A to 7D illustrate the ALC control on the SOA 23b by the SOA controller 25. FIG. 8 illustrates the switching between passing and blocking of signals by the second processor 12-2. The repeater 7 receives optical signals as burst optical signals, which are destined to the OLT 3, from the ONUs 4 and 5 on the downstream side in the time slots allocated to the ONUs 4 and 5.

For example, as illustrated FIG. 7A, burst optical signals #1 to #3 from the ONUs 4 and 5 are input through the first interface section 11 to the SOA 23a. The illustrated burst optical signals #1 to #3 may be optical signals from different ONUs 4 and 5 in serial time slots.

The SOA 23a which is kept ON state during its operations amplifies an input optical signal with a constant gain. For example, since it may be assumed that the power of a 10G optical signal is relatively susceptible to its transmission distance, the level of an input optical signal may have variations as in the burst optical signals #1 to #3 depending on the source ONU 5, as illustrated in FIG. 7A. As a result, since the SOA 23a amplifies with a constant gain, the SOA 23a directly amplifies the optical signal having a variation in level, as illustrated in FIG. 7B.

The SOA 23b performs ALC control on an optical signal output from the SOA 23a with a delay of 1 us given by the optical delay line 24. The PD 22a (or 22b) has a response speed that allows detection of an optical signal level input as a burst signal. The SOA controller 25 controls the gain in the SOA 23b in accordance with the optical signal level detected in the PD 22a (or 22b).

Since the gain control by the SOA 23b in the SOA controller 25 is based on the level of an optical signal before it is input to the optical delay line 24, the SOA 23b receives the corresponding optical signal after the SOA 23b is adjusted for the gain control.

For example, as illustrated in FIG. 7B, the optical signals #1 to #3 which are burst signals are delayed in the optical delay line 24 and are then input to the SOA 23b after the gain control (FIG. 7C). Thus, the SOA 23b outputs the burst optical signals #1 to #3 having a constant level (FIG. 7D).

The first interface section 11 outputs mixed signals of 1G and 10G optical signals to the regenerator 12a included in the first processor 12-1 and the SOA 23a included in the second processor 12-2. This may require avoidance of the collision between the output of the first processor 12-1 which processes a 1G optical signal and the output of the second processor 12-2 which processes a 10G optical signal.

Accordingly, the SOA controller 25 receives, from the regenerator 12a in the first processor 12-1, a signal indicating whether synchronization processing on a 1G signal has been performed in the regenerator 12a or not. If the regenerator 12a has performed synchronization processing on a 1G signal, the time slot is allocated not to a 10G optical signal but to a 1G optical signal. Thus, the SOA 23b is forcibly controlled to OFF state (blocking) to avoid the collision between 1G and 10G optical signals (t 3 to t 6 in FIG. 8).

In this case, for the synchronization of time slots for 1G, the regenerator 12a may require at least the time for Sync illustrated in FIG. 3 plus an identification time for LLID, that is about 850 ns (t1 to t2 in FIG. 8). The optical delay line 24 delays an optical signal in a time slot for 1G output from the SOA 23a. In other words, the time required for receiving the signal upon synchronization in the regenerator 12a and controlling the SOA 23b to OFF state may be a sufficient delay time (1 μs here) before the input of the corresponding 1G optical signal to the SOA 23b (t1 to t3 and t4 to t6 for the subsequent time slot in FIG. 8).

Upon asynchronization by the regenerator 12a, such as in the case where a received signal shifts from a 1G time slot to a 10G time slot, the SOA controller 25 receives a signal notifying of the asynchronization of a 1G signal from the regenerator 12a.

On the basis of the received signal notifying of the asynchronization, the SOA controller 25 cancels the forced OFF control on the SOA 23b. Then, the SOA controller 25 performs ON control (passing control) on the SOA 23b from the beginning of the time slot for 10G following a time slot for 1G. This may avoid, in the case where a received signal shifts from a 1G time slot to a 10G time slot, the takeover of the forced OFF control in the SOA 23b in the preceding time slot to the 10G time slot (t6 in FIG. 8).

The third processor 12-3 performs processing corresponding to an optical signal having a second transmission rate of 10G on an optical signal on the fourth path p4 having the downstream direction (second direction). In other words, the third processor 12-3 receives light having a wavelength range of 1574 to 1580 nm (refer to FIG. 2B) of a 10G optical signal propagating through the fourth path p4. The third processor 12-3 may apply an optical amplifier having the wavelength range of the optical signal input through the fourth path p4 as its optical amplification band, for example. For example, a semiconductor optical amplifier (SOA) may be applied.

FIG. 2C illustrates an amplified wavelength range (C1) of the SOAs 23a and 23b in the second processor 12-2 and an amplified wavelength range (C2) of an SOA functioning as the third processor 12-3. The SOAs 23a and 23b have amplified wavelength ranges which cover a wavelength range (of 1260 to 1280 nm, refer to FIG. 2B) of a 10G upstream optical signal. On the other hand, the SOAs 23a and 23b do not cover all bands in a wavelength range (of 1260 to 1360 nm, refer to FIG. 2A) of a 1G upstream optical signal. Also because of this, processing is performed on a 1G upstream optical signal in the regenerator 12a, rather than relay processing with optical amplification.

The SOA functioning as the third processor 12-3 may have a band C2 that covers a wavelength range for a 10G downstream optical signal. As illustrated in FIG. 2D, even in the case where an erbium doped fiber amplifier (EDFA) performs as the third processor 12-3, the wavelength range for a 10G downstream optical signal may be covered as an amplified wavelength range.

However, in the case where the frame format illustrated in FIG. 3 is applied to the PON system 1, there is room for improvement as a communication system that a received signal shifts from a 1G time slot to a 10G time slot, for example, as will be described below.

In other words, in the frame format illustrated in FIG. 3, it is defined that an optical signal is turned on within an optical signal rising period (Ton) and that an optical signal is turned off within an optical signal falling period (Toff). However, an extinction period between burst signals is not particularly defined.

For that reason, the Toff and Ton may be serial between burst signals (or between serial time slots). In other words, since the period defined as the Toff may not be provided as an extinction period for an optical signal, no extinction period between serial burst signals may be assumed.

In this case, it is difficult for the SOA controller 25 to perform ON/OFF control on the SOA 23b in accordance with electric signals detected from the photo diodes 22a and 22b. Therefore, in accordance with the presence of the input of a signal indicating synchronization from the regenerator 12a, relay operation is switched with the shift from a 1G time slot to a 10G time slot.

Though the time required for synchronization on 1G signals in the regenerator 12a is defined, an asynchronization time (that is the time for detecting asynchronization) is not particularly defined. Thus, upon a received signal shifting from 1G to 10G, the forced OFF state is not cancelled, but the SOA 23b is kept off state even when a 10G signal passes therethrough, which may cause a problem in relay of a 10G signal.

Figure 9:
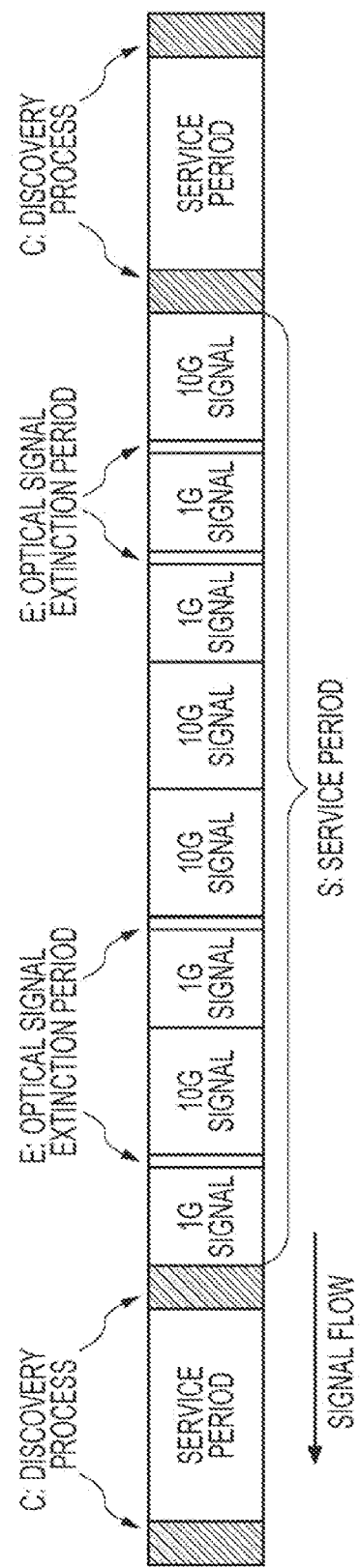
FIG. 9 illustrates an example of access control by an OLT.

This embodiment proposes the OLT 3 as will be described below. The OLT 3 performs access control using the dynamic bandwidth allocation on a signal (upstream signal) from the ONUs 4 and 5. In the proposed OLT 3, as illustrated in FIG. 9, the access control provides an extinction period E between the end of each 1G time slot and the next time slot. More specifically, an extinction period E is provided between a 1G time slot and the time slot (which may be a 1G time slot or 10G time slot) subsequent to the 1G time slot.

Thus, an extinction period E may be provided in each time slot even when a frame without an extinction period at the beginning or end thereof is transmitted, as illustrated in FIG. 3.

As illustrated in FIG. 9, in the OLT 3, the access control dynamically allocates a time slot for a 1G signal or a time slot for a 10G signal to the ONUs 4 and 5 in association during a service period S. In other words, in the OLT 3, processing times are set individually for processing on each of optical signals transmitted from the ONUs 4 and 5. This prevents the collision between signals upon transmission and reception of optical signals from the ONUs 4 and 5 to the OLT 3.

A non-service period C is set for each predetermined service period S. In the non-service period C, a discovery process may be performed by which an ONU newly connected to the PON system 1 may be detected, for example. Simultaneously with the discovery process, a ranging timing process may be performed. The ranging timing process includes measuring distances between the ONUs 4 and 5 and the OLT 3 and adjusting timings of transmission and reception.

The non-service period is periodically set between service periods, and the processes as described above are performed therein. Thus, in the OLT 3, a newly added ONU may be detected, and all ONUs under the control of the OLT 3 may be registered with the OLT 3. In the OLT 3, a 10G ONU and a 1G ONU may be distinguished for the registration. This allows providing an extinction period E in the time following a time slot for a 1G signal.

Second Embodiment

Figure 10:
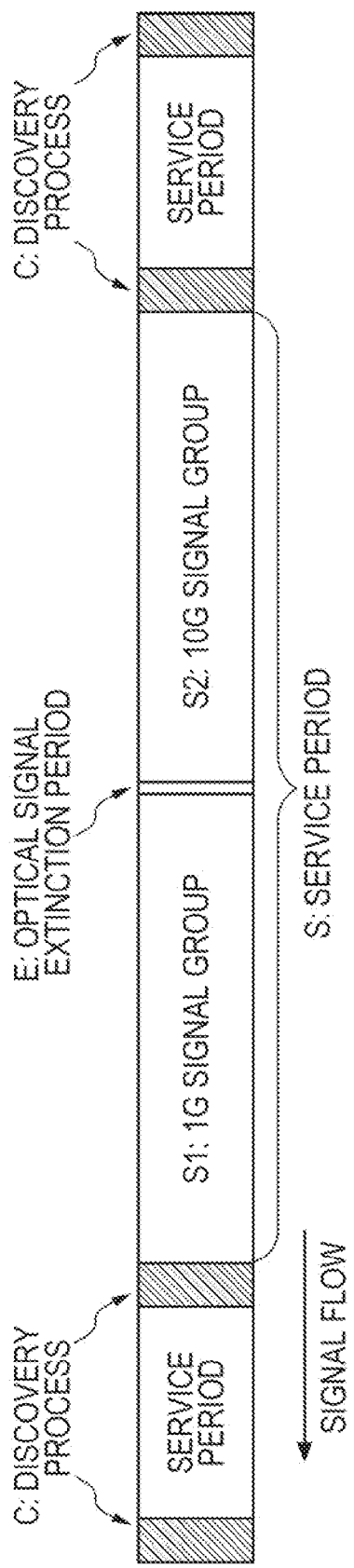
FIG. 10 illustrates another example of access control by the OLT.

FIG. 10 illustrates another example of an extinction period E provided at the end of a 1G time slot. In the example in FIG. 10, time slots with an equal transmission rate are collectively allocated on a time axis. For example, time slots for 1G signals and time slots for a 10G signal are collectively allocated in a period 51 and a period S2, respectively. An extinction period E is provided in the time subsequent to the period 51 in which a group of time slots for 1G signals are allocated.

In both of the cases in FIG. 9 and FIG. 10, an extinction period E is provided before the time slots for 10G signals subsequent to the time slots for 1G signals. Thus, proper relay processing is performed in accordance with the transmission rate in the repeater 7.

In other words, in the extinction period E before the time slot for a 10G signal, the SOA controller 25 controls the SOA 23b to OFF state. The SOA controller 25 then controls the SOA 23b to ON state in accordance with the optical input at the beginning of the subsequent 10G signal time slot. This allows ON-control on the SOA 23b without waiting for cancellation of the forced OFF by the regenerator 12a and proper amplification processing from the beginning of a 10G time slot (10G signal group).

Figure 11:
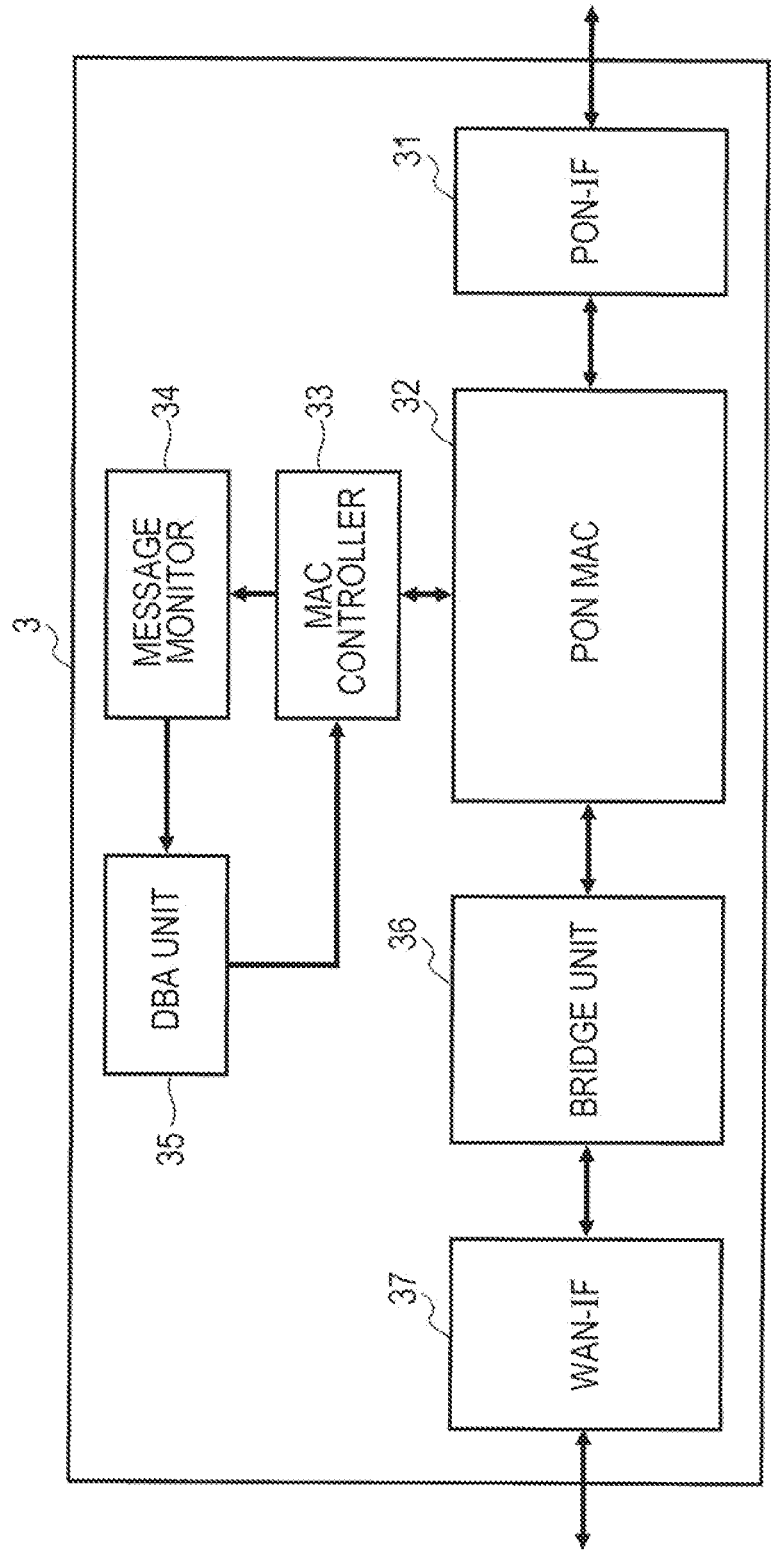
FIG. 11 illustrates a configuration example of the OLT.

FIG. 11 illustrates a configuration example of the OLT 3. The illustrated OLT 3 includes a PON-interface (PON-IF) 31, a PON media access control (PON MAC) 32, a MAC controller 33, a message monitor 34, a dynamic bandwidth allocation (DBA) unit 35, a bridge unit 36, and a wide area network-IF (WAN-IF) 37.

The PON-IF 31 is a transmitter/receiver for an optical signal to be communicated in a network system 1. A signal in a downstream direction (from the OLT 3 to the ONUs 4 and 5) is converted to an electrical signal from an optical signal, and a signal in an upstream direction (from one of the ONUs 4 and 5 to the OLT 3) is converted from an optical signal to an electrical signal.

The PON MAC 32 extracts a control frame from a receive signal used in the network system 1 or gives a control frame to a transmit signal. The MAC controller 33 receives the control frame extracted from a receive signal by the PON MAC 32 and performs necessary processing thereon on the basis of the information included in the control frame. The MAC controller 33 may generate a control frame to be given to a transmit signal to an ONU, for example.

The message monitor 34 gathers LLIDs included in control frames input through the MAC controller 33 and transmission request information from an ONU. On the basis of the transmission request information gathered by the message monitor 34, the DBA unit 35 allocates a transmission band from the ONU in accordance with the amount of upstream traffic. For processing the transmission band allocation, an allocation parameter such as an allocated time, an optical wavelength and a bit rate may be used.

The bridge unit 36 is a data converting part which transfers data transmitted from a user (such as a terminal under the control of an ONU in the network system 1) to a network of a communication carrier (WAN). The WAN-IF 37 is a network interface part for connecting to a network of a communication carrier.

Figure 12:
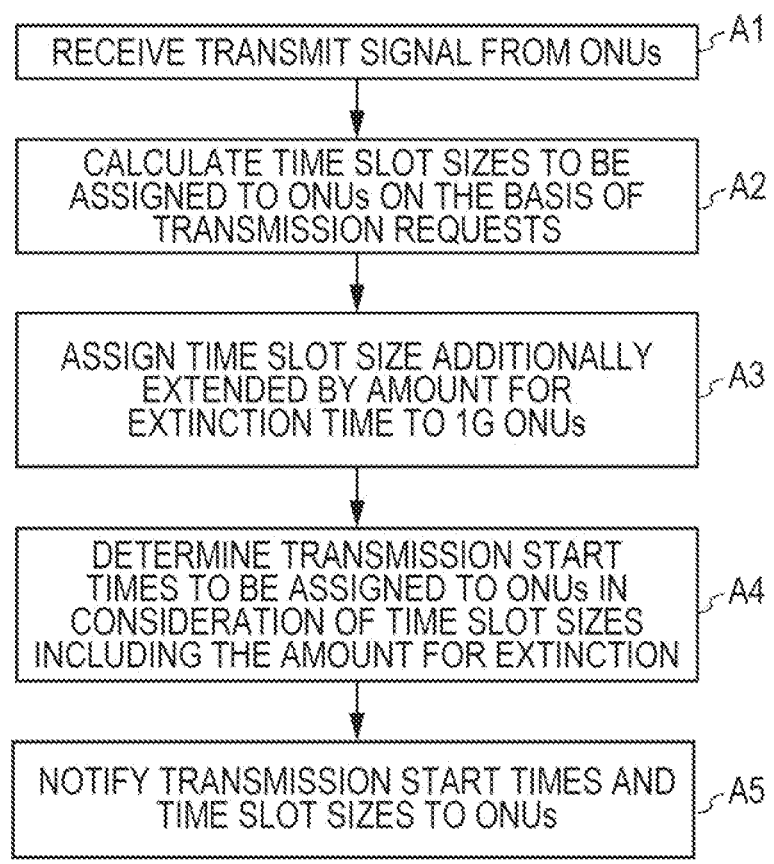
FIG. 12 is a flowchart illustrating processing by the OLT which allocates and sets a time slot illustrated in FIG. 9.

FIG. 12 is a flowchart describing processing by the OLT 3 which allocates and sets a time slot illustrated in FIG. 9. The message monitor 34 in the OLT 3 receives a transmission request through a control frame from each of the ONUs 4 and 5 (step A1). The transmission request may include information related to a band requested to use. The information related to band may include a parameter such as a transmission time, a wavelength range and a transmission rate.

The DBA unit 35 dynamically allocates a band and calculates the size of a time slot in accordance with details of the transmission request notified from the message monitor 34 (step A2). In this case, the DBA unit 35 allocates a time slot having an extended size for an extinction period E to be set to the ONU 4 using a 1G signal (step A3). Since the time slot size is in steps of 16 ns, 16 ns×3=48 ns may be additionally allocated, for example.

Next, on the basis of the calculated time slot size and the transmission distance measured in the ranging timing process, the DBA unit 35 determines a transmission start time to be allocated to each of the ONUs 4 and 5 and notifies the MAC controller 33 of it. The allocation and determination of a transmission start time are performed in consideration of the size of an extended time slot additionally including an extinction period for the ONU 4 using a 1G signal (step A4). Having described that a transmission start time is allocated and determined on the basis of the extended time slot size, the DBA unit 35 may not change the time slot size itself but may set a transmission start time in consideration of the extinction period.

The OLT 3 notifies each of the ONUs 4 and 5 of a transmission start time and a time slot size through a control frame generated by the MAC controller 33 (step A5). The time slot size notified to each of the ONUs 4 does not include an extinction period, that is, the time slot size is a size of the time slot calculated by the DBA unit 35 having a size not extended with the extinction period. This allows the ONUs 4 and 5 to perform optical transmission by excluding a signal component in the set extinction period E.

Figure 13:
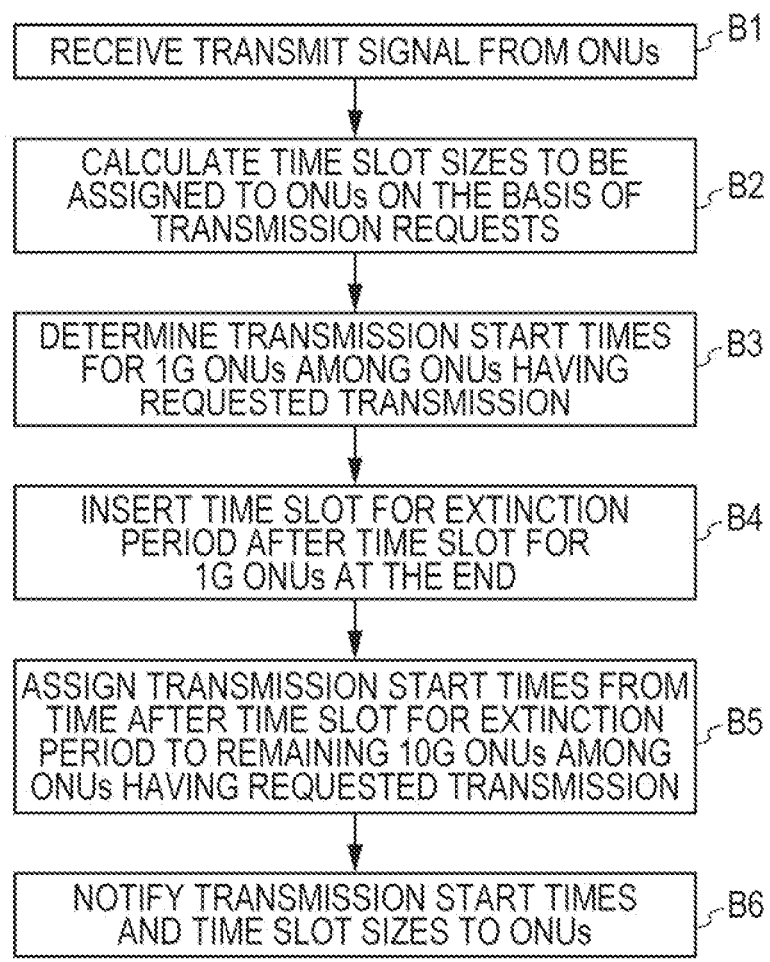
FIG. 13 is a flowchart illustrating processing by the OLT which allocates and sets a time slot illustrated in FIG. 10.

FIG. 13 is a flowchart describing processing in the OLT 3 which allocates and sets a time slot illustrated in FIG. 10. The message monitor 34 in the OLT 3 receives transmission requests through control frames from the ONUs 4 and 5 (step B1), like step A1 in FIG. 12.

The DBA unit 35 dynamically allocates a band and calculates the size of a time slot in accordance with details of the transmission requests notified from the message monitor 34 (step B2). Next, transmission start times are determined only for the ONUs 4 using a 1G signal of the ONUs 4 and 5 having issued transmission requests (step B3). A time slot for an extinction period E is allocated at the end of the time slots for the ONUs 4 (step B4).

After that, the DBA unit 35 allocates transmission start times for the remaining ONUs 5 using a 10G signal of the ONUs 4 and 5 having issued transmission requests in the time after the time slot for the extinction period E (step B5). The DBA unit 35 notifies the MAC controller 33 of the determined allocation of the transmission start times and time slot sizes for the ONUs 4 and 5. By transmitting a generated control packet, the MAC controller 33 notifies the ONUs 4 and 5 of the allocation of the corresponding transmission start times and time slot sizes for the ONUs 4 and 5 (step B6).

Thus, changing the transmission times of 10G signals and 1G signals within a service time may be only required to allow allocation of time slots based on the relay processing in the repeater 7. According to the proposed art, it may be easily implemented without changing the functions of the OLT 3 largely.

According to the disclosed art, proper communication, such as transmission processing by the ONU 4 based on the transmission start time set by the OLT 3 and relay processing by the repeater 7, with different optical signals in a network system including mixed optical signals with different transmission rates may be implemented. Relay processing in accordance with the transmission rate and transmission direction of an optical signal to be transmitted bidirectionally may be supported in the case where mixed optical signals with different transmission rates are to be handled.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A terminal apparatus connecting through a splitter and a repeater with each of a first terminating apparatus and a second terminating apparatus, the terminal apparatus comprising:
   a memory; and
   a processor coupled to the memory, wherein the processor executes
      a transmitting procedure to transmit an optical signal at a first transmission rate to the first terminating apparatus and to transmit an optical signal at a second transmission rate to the second terminating apparatus, the second transmission rate being at least 1 gigabit per second lower than the first transmission rate,
      a gathering procedure to gather transmission request information from each of the first terminating apparatus and the second terminating apparatus,
      a dynamic bandwidth allocation procedure to allocate a transmission band for communicating with each of the first terminating apparatus and the second terminating apparatus in accordance with the gathered transmission request information, determine a size and an alignment position of a time slot in accordance with the allocated transmission band, determine a transmission start time of the time slot for each of the first terminating apparatus and the second terminating apparatus, and allocate an extinction period, only between a time slot of the optical signal with the second transmission rate and a time slot following the time slot of the optical signal with the second transmission rate, so as to stop a transmission of an optical signal, and
      a generating procedure to generate a control frame for notifying each of the first terminating apparatus and the second terminating apparatus of the transmission start time and the size of the time slot.

2. A data transmission system comprising:
   a terminal apparatus to communicate by using an optical signal with a first transmission rate and an optical signal with a second transmission rate, the second transmission rate being at least 1 gigabit per second lower than the first transmission rate;
   a plurality of terminating apparatuses connecting with the terminal apparatus through optical transmission lines, the plurality of terminating apparatuses including a first terminating apparatus to perform processing on an optical signal with the first transmission rate, and a second terminating apparatus to perform processing on an optical signal with the second transmission rate;
   a splitter to divide a signal light from the terminal apparatus, transfer the divided signal light to each terminating apparatus, couple signal lights from the terminating apparatuses, and transfer the coupled signal light to the terminal apparatus, the splitter being allocated between the terminal apparatus and the plurality of terminating apparatuses; and
   a repeater to relay a signal light having the optical signal with the first transmission rate and the optical signal with the second transmission rate in accordance with the transmission rate, the repeater being allocated between the terminal apparatus and the plurality of terminating apparatuses,
   wherein the terminal apparatus gathers transmission request information from each of the first terminating apparatus and the second terminating apparatus,
   performs dynamic bandwidth allocation to allocate each transmission band for communicating with each of the first terminating apparatus and the second terminating apparatus in accordance with the gathered transmission request information, determining a size and an alignment position of a time slot in accordance with the allocated transmission band, determining a transmission start time of a time slot for each of the first terminating apparatus and the second terminating apparatus, and allocating an extinction period, only between a time slot of the optical signal with the second transmission rate and a time slot following the time slot of the optical signal with the second transmission rate, so as to stop a transmission of an optical signal, and
   generates a control frame for notifying each of the first terminating apparatus and the second terminating apparatus of the transmission start time and the size of the time slot.

3. A transmission method of a terminal apparatus connecting through a splitter and a repeater with each of a first terminating apparatus and a second terminating apparatus, the transmission method of the terminal apparatus comprising:
   transmitting an optical signal at a first transmission rate to the first terminating apparatus and transmitting an optical signal at a second transmission rate to the second terminating apparatus, the second transmission rate being at least 1 gigabit per second lower than the first transmission rate;
   gathering transmission request information from each of the first terminating apparatus and the second terminating apparatus;
   allocating each transmission band for communicating with each of the first terminating apparatus and the second terminating apparatus in accordance with the gathered transmission request information;
   determining a size and an alignment position of a time slot in accordance with the allocated transmission band;
   determining a transmission start time of the time slot for each of the first terminating apparatus and the second terminating apparatus;
   allocating an extinction period, only between a time slot of the optical signal with the second transmission rate and a time slot following the time slot of the optical signal with the second transmission rate, so as to stop a transmission of an optical signal; and
   generating a control frame for notifying each of the first terminating apparatus and the second terminating apparatus of the transmission start time and the size of the time slot.

* * * * *